(12) United States Patent
Eloyan

(10) Patent No.: US 12,222,192 B2
(45) Date of Patent: Feb. 11, 2025

(54) SECURITY SYSTEM PROVIDING PROTECTION FROM DRONES

(71) Applicant: Armen Eloyan, Alpharetta, GA (US)

(72) Inventor: Armen Eloyan, Alpharetta, GA (US)

( * ) Notice: Subject to any disclaimer, the term of this patent is extended or adjusted under 35 U.S.C. 154(b) by 232 days.

(21) Appl. No.: 17/753,597

(22) PCT Filed: Feb. 27, 2021

(86) PCT No.: PCT/US2021/070204
§ 371 (c)(1),
(2) Date: Mar. 9, 2022

(87) PCT Pub. No.: WO2022/056500
PCT Pub. Date: Mar. 17, 2022

(65) Prior Publication Data
US 2023/0080332 A1    Mar. 16, 2023

Related U.S. Application Data

(60) Provisional application No. 62/706,840, filed on Sep. 14, 2020.

(51) Int. Cl.
| F41H 11/00 | (2006.01) |
| H04W 4/021 | (2018.01) |
| H04W 4/44 | (2018.01) |

(52) U.S. Cl.
CPC ............ *F41H 11/00* (2013.01); *H04W 4/021* (2013.01); *H04W 4/44* (2018.02)

(58) Field of Classification Search
None
See application file for complete search history.

(56) References Cited

U.S. PATENT DOCUMENTS

| 9,715,009 | B1 * | 7/2017 | Parker ................. F41H 13/0075 |
| 10,546,441 | B2 * | 1/2020 | Joao ........................ H04L 63/08 |
| 10,866,597 | B1 * | 12/2020 | Reinhold .............. B64C 39/022 |
| 10,907,940 | B1 * | 2/2021 | Parker .................... G06N 20/00 |
| 11,022,407 | B2 * | 6/2021 | Whitmarsh .......... G08G 5/0069 |
| 11,094,202 | B2 * | 8/2021 | Gong ................... G08G 5/0082 |
| 11,170,639 | B2 * | 11/2021 | Wickramarathne ......................... G01C 21/3691 |
| 11,193,738 | B1 * | 12/2021 | Schultheis .............. F41H 11/02 |
| 2017/0092138 | A1 | 3/2017 | Trundle et al. |

(Continued)

*Primary Examiner* — K. Wong
(74) *Attorney, Agent, or Firm* — Carson Patents; Gregory D Carson

(57) ABSTRACT

The present invention is a security system for providing a zone (area) of protection from triphibian drones in the form of an apparatus comprising sonic sensors to sonically detect and triangulate the presence and current position of remotely controlled, operated, or otherwise unmanned vehicles within six-hundred meters of said apparatus; computer enabled software to automatically and securely identify a plurality of users, and to detect, configure, and establish a perimeter for a home or ranch with two or more sensors, and to automatically activate and provide notices and/or warnings for users and occupants when drones are detected; and software to automatically activate/enable drone countermeasures to prevent intrusion by and provide protection against autonomous vehicles and aerial, aquatic, terrestrial, amphibian, biphibian, and triphibian drones into the space surrounding a home or ranch.

13 Claims, 2 Drawing Sheets

(56) References Cited

U.S. PATENT DOCUMENTS

| | | |
|---|---|---|
| 2018/0364662 A1 | 12/2018 | Meganathan et al. |
| 2020/0037166 A1* | 1/2020 | Shattil ................. H04L 27/0012 |
| 2020/0272827 A1 | 8/2020 | Morrow et al. |
| 2021/0197967 A1* | 7/2021 | Song .................... G08G 5/0013 |

* cited by examiner

SECURITY SYSTEM PROVIDING PROTECTION FROM DRONES

TECHNICAL FIELD OF THE INVENTION

This invention relates generally to a Security System Providing Protection from Drones in the form of an apparatus to sonically detect and triangulate the presence and current position of remotely controlled, operated, or otherwise unmanned vehicles in the general vicinity of said apparatus and automatically activate notices, warnings, and countermeasures to prevent intrusion by and provide protection against autonomous vehicles and aerial, aquatic, terrestrial, amphibian, biphibian, and triphibian drones into the space surrounding a home or ranch.

This invention relates specifically to sonically detecting and triangulating the presence and current position of aerial, aquatic, terrestrial, amphibian, biphibian, and triphibian drones. Then it automatically sends wireless electronic alerts and notices, to include automated voice, email, text, image, and video message broadcast to the user of said security dome apparatus, and automatically activating drone entry, access, or viewing counter-measures to assume control over, jam, and/or disable said drone's radio, and its video transmissions, and radio control signals thereby disabling drone operation and effectiveness within the sonically protected area, space or volume.

This invention further relates to electronic physical security devices that enable theft and tamper resistance, active audio and video communications, and communications means to notify users, groups of users, or public authorities, with email, image, text, voice, and video messaging of the current status and state of all devices connected to said security dome apparatus.

BACKGROUND

Today there are few devices and apparatuses that are intending to prevent intrusion by and protection against autonomous vehicles and aerial, aquatic, terrestrial, amphibian, biphibian, and triphibian drones into the space surrounding a home or ranch. There are drone detection devices; anti-drone birds; anti-drone drones; radio control signal jammers; drone blinding lasers; and drone software hacking/hijacking devices.

There is, however, a need for a system enabled to prevent intrusion by and provide protection against autonomous vehicles and aerial, aquatic, terrestrial, amphibian, biphibian, and triphibian drones into the space surrounding a home or ranch that offers customization of perimeter of protection coverage boundaries; computer system user, biometric user, and occupant security (e.g. face recognition); theft and tamper resistance enabling confidence of competent remote operation (e.g. electric shock for unauthorized access and warnings/notifications with audio, images, and video of unauthorized persons); neighborhood watch information sharing when there is a common space of coverage between two systems, and provide public authority notification (e.g. unsafe marker indications from users so indicating, as well as available audio, images, and video of unidentified person (s) the reporting system collected and other similar and/or matching data from other neighborhood connected systems).

BRIEF SUMMARY OF THE INVENTION

According to a first aspect of the invention, there is a Security System Providing Protection from Drones for detecting, deterring, and disabling a drone upon entry of said drone within a protected zone having at least three boundary dimensions comprising a control device comprising a box having a software application operating on a central processing device, a digital data store, a wireless communications device, a wired communication device, and a power source, a first sensor device comprising a weather resistant box having an user operation interface, a software application operating on a central processing device, a digital data store, a wireless communications device, a microphone, a camera, and a power source, and a second sensor device comprising a weather resistant box having an user operation interface for an user, a software application operating on a central processing device, a digital data store, a wireless communications device, a microphone, a camera, and a power source configured to enable an user to input said boundary dimensions and determine a spatial volume for said protection zone, to hear a sound coming from said drone (detect), to broadcast a false GPS signal to said drone and thereby disorient said drone (deter), and to broadcast a false operator control signal to said drone and thereby interfere with said drone's operation (disable), and to record a reporting of a position, a direction, and a speed calculation for said drone thereby enabling a drone position travel log having a series of said reports.

According to a second aspect of the invention, there is an embodiment further comprising a video camera device comprising a weather resistant box having a central processing device, a digital data store, a wireless communications device, a camera, and a power source enabled for operational control by the control device or the sensor device enabling an additional video feed for said sensor device.

According to a third aspect of the invention, there is an embodiment and the preferred embodiment further comprising a 2-way speaker device comprising a weather resistant box having a central processing device, a digital data store, a wireless communications device, an audio speaker, a microphone, and a power source enabled for operational control by said sensor device enabling a two way audio communication to enable an audio security verification and an audible tone/alarm signal.

According to a fourth aspect of the invention, there is an embodiment and the preferred embodiment further comprising a security lighting unit comprising a weather resistant box having a central processing device, a wireless communications device, a light source, and a power source enabled for operational control by said control device or said sensor device enabling a visible light projection.

According to a fifth aspect of the invention, there is an embodiment and the preferred embodiment further comprising a drone jamming unit comprising a software application running on a central processing device, a digital data store, a wireless communications device, and a power source enabled for operational control by said control device or said sensor device enabling a wireless communications signal jamming of said drone.

According to a sixth aspect of the invention, there is an embodiment and the preferred embodiment further comprising said sensor unit configured to forward a detected data to said central device for processing thereby enabling a power savings for said sensor unit.

An advantage of the apparatus of the Home and Ranch Security Dome is the limited range of sonic detection so as to not over extend potential coverage space. An advantage of the apparatus of the Home and Ranch Security Dome is the theft and tamper resistance enables confidence of competent unattended remote operation due to the security features which include but are not limited to electric shock for unauthorized access and notification and warnings with audio, images, and video of unidentified persons. An advantage of the apparatus of the Home and Ranch Security Dome is the neighborhood watch information sharing when there is a common space of coverage between two systems, which enables safe and unsafe user declarations to be shared and used between multiple security dome systems and their users to improve neighborhood security, and increases the validity of the security dome systems capability to provide public authority notification.

The invention will now be described, by way of example only, with reference to the accompanying drawings in which:

DETAILED DESCRIPTION

The detailed embodiments of the present invention are disclosed herein. The disclosed embodiments are merely exemplary of the invention, which may be embodied in various forms. The details disclosed herein are not to be interpreted as limiting, but merely as the basis for the claims and as a basis for teaching one skilled in the art how to make and use the invention.

References in the specification to "one embodiment," "an embodiment," "an example embodiment," etcetera indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described.

Furthermore, it should be understood that spatial descriptions (e.g., "above," "below," "up," "left," "right," "down," "top," "bottom," "vertical," "horizontal," etc.) used herein are for purposes of illustration only, and that practical implementations of the structures described herein can be spatially arranged in any orientation or manner.

Figure 1:
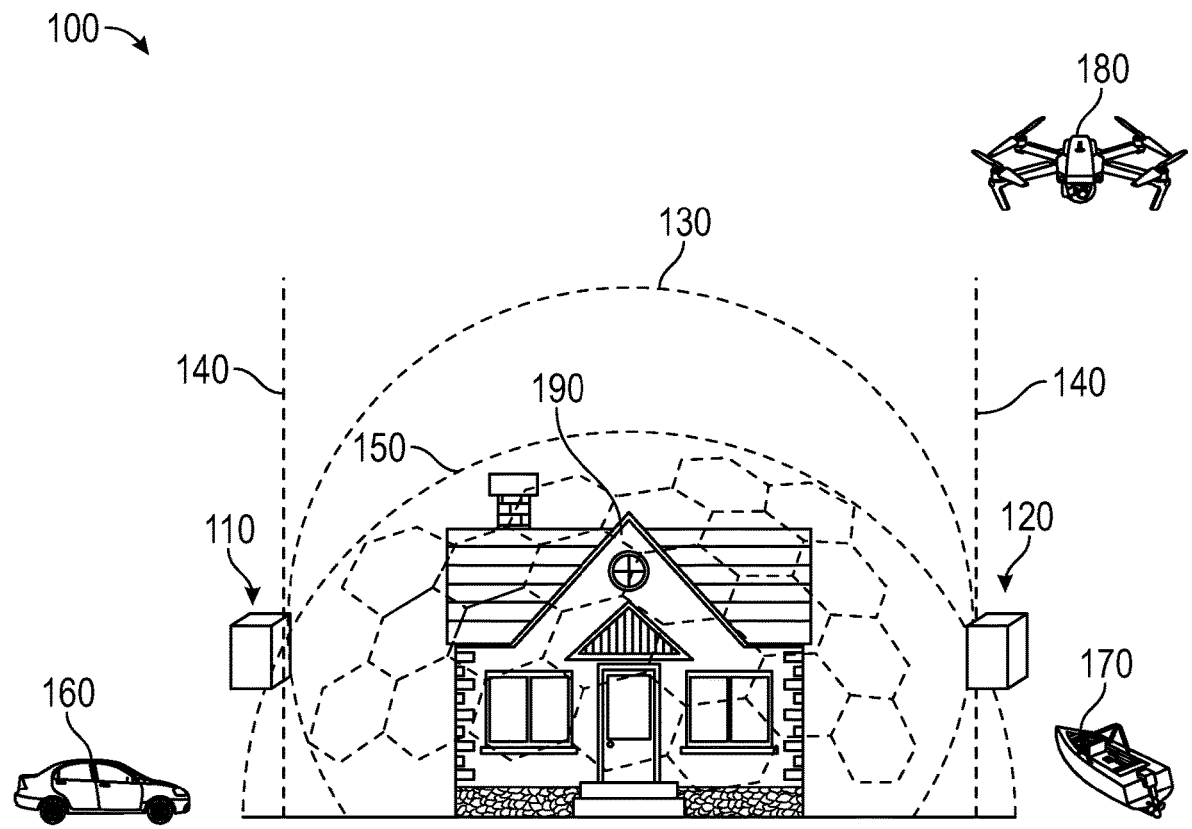
FIG. 1 is a view of the Security System Providing Protection from Drones coverage space for a home or ranch according to the invention.

Referring to the Figures, there is shown in FIG. 1:

Element 100 which is a Security System Providing Protection from Drones overview figure showing the coverage space for a home or ranch.

Elements 110 and 120 are multi-function computer networked sensors.

Element 130 shows the space surrounding a home or ranch, Element 190, that is within the area that could be protected by the system (100). In other words, Element 130 is the maximum boundary of potential space that could be protected by the system (100).

Element 140 shows the space surrounding a home or ranch, 190, that defines the area or zone of protection surrounding the home or ranch that is protected by the system (100).

Element 150 shows a vertical or height range adjustability of the coverage space of the system (100). In other words, Element 150, shows the space surrounding a home or ranch, 190, that is within the area that could be protected by the system, 130, lowered to a new a vertical or height range of protection potential.

Element 160 shows a remotely controlled terrestrial drone.

Element 170 shows a remotely controlled aquatic drone.

Element 170 shows a remotely controlled aerial drone.

Figure 2:
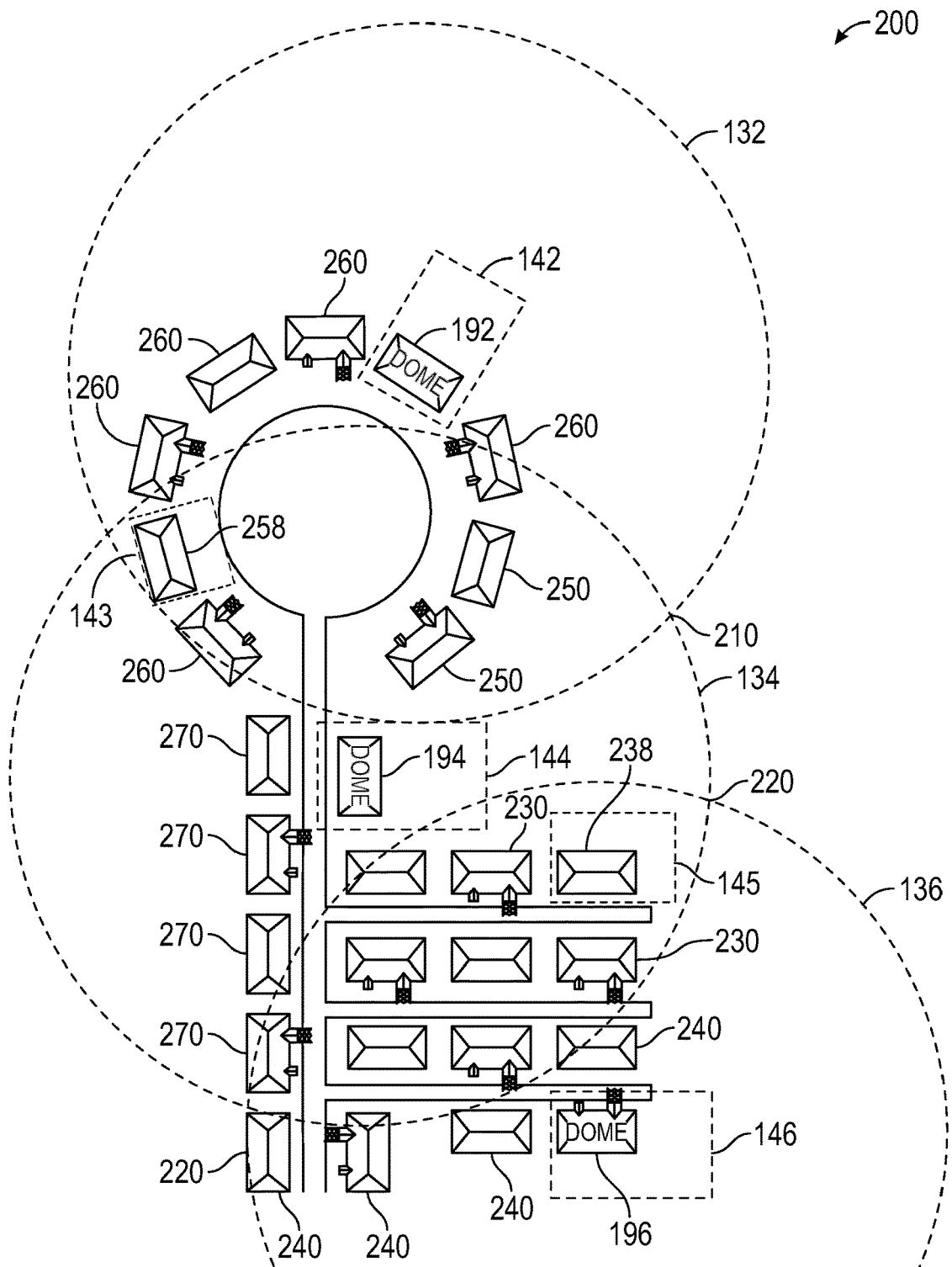
FIG. 2 is a view showing three Security System Providing Protection from Drones systems according to the invention and demonstrating the coverage overlap between systems installed in a residential neighborhood.

Referring to the Figures, the following elements are shown in FIG. 2, wherein:

Element 200 is a neighborhood of homes in where three have a Security System Providing Protection from Triphibian Drone systems installed and operational.

Element 132 shows the space surrounding a home or ranch, Element (192), that is within the area that could be protected by an installed system (100) operating to provide protection for (192). In other words, Element 132 is the maximum boundary of potential space that could be protected by a system (100) installed and operational at home or ranch, (192).

Element 134 shows the space surrounding a home or ranch, Element (194), that is within the area that could be protected by an installed system (100) operating to provide protection for (194). In other words, Element 134 is the maximum boundary of potential space that could be protected by a system (100) installed and operational at home or ranch, (194).

Element 136 shows the space surrounding a home or ranch, Element (196), that is within the area that could be protected by an installed system (100) operating to provide protection for (196). In other words, Element 136 is the maximum boundary of potential space that could be protected by a system (100) installed and operational at home or ranch, (196).

Element 142 shows the space surrounding a home or ranch, (192), that is within the area being protected by an installed system (100) operating to provide protection for (192). In other words, Element 142 is the boundary of space that is being protected by a system (100) installed and operational at home or ranch, (192).

Element 144 shows the space surrounding a home or ranch, (194), that is within the area being protected by an installed system (100) operating to provide protection for (194). In other words, Element 144 is the boundary of space that is being protected by a system (100) installed and operational at home or ranch, (194).

Element 146 shows the space surrounding a home or ranch, (196), that is within the area being protected by an installed system (100) operating to provide protection for (196). In other words, Element 146 is the boundary of space that is being protected by a system (100) installed and operational at home or ranch, (196).

Element 210 shows a potential protection area in a neighborhood (200) that becomes possible when two systems (100) are installed close enough to each other in homes (192) and (194) so as to be able to provide potential protection coverage to a common area of said neighborhood (200) that is potentially protectable by said two systems (100) located, one each, in said homes (192) and (194).

Element 220 shows a potential protection area in a neighborhood (200) that becomes possible when two systems (100) are installed close enough to each other in homes (194) and (196) so as to be able to provide potential protection coverage to a common area of said neighborhood (200) that is potentially protectable by both systems (100) located, one each, in said homes (194) and (196).

Elements 230 are homes without protection systems (100) installed that are within the potential protection coverage areas of the systems (100) installed in homes (194) and (196). Homes within two protected areas, provided by two systems (100) at homes (194) and (196) may also be protected by the cooperation of the two systems (100) to enable protection for the home(s) without an installed system (100).

Elements 240 are homes without protection systems (100) installed that are within the potential protection coverage area of the system (100) installed in home (196).

Elements 250 are homes without protection systems (100) installed that are within the potential protection coverage areas of the systems (100) installed in homes (192) and (194). Homes within two protected areas, provided by two systems (100) may also be protected by the cooperation of the two systems (100) to enable protection for the home without an installed system (100).

Elements 260 are homes without protection systems (100) installed that are within the potential protection coverage area (132) of the system (100) installed in home or ranch (192).

Elements 270 are homes without protection systems (100) installed that are within the potential protection coverage area of the system (100) installed in home (194).

As shown in FIG. 2, Element 143 shows the space surrounding a home or ranch, 258, that is within the area being protected by an installed system (100) operating to provide protection for (192), and 143 is also within the area being protected by an installed system (100) operating to provide protection for (194). In other words, Element 143 is the boundary of space that is being protected by cooperation between two systems (100), one each installed in homes (192) and (194).

As shown in FIG. 2, Element 145 shows the space surrounding a home or ranch, 238, that is within the area being protected by an installed system (100) operating to provide protection for (194), and 145 is also within the area being protected by an installed system (100) operating to provide protection for (196). In other words, Element 145 is the boundary of space that is being protected by cooperation between two systems (100), one each installed in homes (194) and (196).

Two systems (100) that are installed such that the potential protection space covers a common area can provide protection for any area or space definable within the area jointly covered by two systems (100). As shown in FIG. 2, home or ranch 238, is within the potential protection coverage space/area (132) of a system (100) installed in home or ranch (192), and 238 is within the potential protection coverage space/area (134) of another system (100) installed in home or ranch (194). The two systems (100) are enabled to cooperate so as to enable to each system's sensors 110, and 120 to work with the sensors (110, and 120) of the other system (100) and to define a protection zone around a home or ranch without an installed system.

The protection zone/space/area (140) in and around the perimeter of a home or ranch (190) is customizable to any suitable zone/space/area that is a subset of the maximum protection zone (130) of a system (100). The software of the present invention enables a user to define a perimeter, zone, space, or area within the maximum zone (130) of any shape, size, or dimension that fits within the maximum protection zone (130) of a system (100). Alternatively, this protection zone customization can be extended to include multiple, and/or other spaces/areas of protection, such as in FIG. 2 wherein home or ranch 238 is afforded a separate protection zone (145) of its own due to the cooperation of the two systems (100) installed in home or ranch ((192)), and home or ranch (194), or the similar situation as is present for home or ranch 258 and its separate protection zone (143).

The apparatus of the present invention is comprised of sonic sensors to sonically detect and triangulate the presence and current position of remotely controlled, operated, or otherwise unmanned vehicles within six-hundred meters of said apparatus; computer enabled software to automatically and securely identify a plurality of users, and to detect, configure, and establish a perimeter for a home or ranch with two or more sensors (110, and 120), wherein the software enables the system to activate and provide notices and/or warnings for users and occupants when drones are detected; software to automatically activate/enable drone countermeasures to prevent intrusion by and provide protection against autonomous vehicles and aerial, aquatic, terrestrial, amphibian, biphibian, and triphibian drones into the space surrounding a home or ranch, wherein the dome security apparatus further comprises computer enabled software to enable customization of perimeter of protection coverage boundaries; biometric user and occupant security, to include but not be limited to face recognition; theft and tamper resistance enabling confidence of competent remote operation, to include but not be limited to notification and warnings with audio, images, and video of unidentified persons; neighborhood watch information sharing when there is a common space of coverage between two systems; public authority notification to include, but not be limited to, alert/change/warning indications from systems and audio, images, and video of unidentified persons.

In an embodiment, the sensors of the apparatus are ultra-sonic outside of the decibel range of human hearing, and are integrated computer hardware and software components forming parts of the multi-function computer networked sensors (110, and 120). The multi-function computer networked sensors (110, and 120) may alternatively be comprising any digital electronic acoustic sensors using sound ranges that do not encroach upon human and domesticated animal decibel hearing ranges.

In the preferred embodiment, the system of the computer enabled software is a digital computer internet enabled network based software application that enables detection and incapacitation of drones operated at the edges of the protected zone, 140, of a home or ranch, 190. The system (100) consists of two multi-function networked sensors (110, and 120) that are further comprising software automation to enable said sensors to self-organize into a meshed network.

Each sensor (110, and 120) contains, but is not limited to, one or more of the following: an acoustic detector, a motion detector, an infrared sensor array, an infrared LED, a solar cell enabled power capacitor/supply, an acoustic generator, and an antenna. These sensor arrays detect, quantify, and forward relevant situational information regarding the presence of any triphibian drones approaching, near, or within the protected zone (140) and the drone's current location and activity to the system, and other authorized and/or designated recipients. The sensor units (110, and 120) are furthering comprising computer enabled software to enable said sensors to self-organize into a secure digital computer network upon installation, activation, deployment, or automatic enablement.

The sensor network, a collection of a plurality of sensors (110, and 120) continually provides specific data and information sets regarding the presence of any triphibian drones approaching, near, or within the protected zone (140), the current location, and the activity of the detected drone. These data sets include active alerts and detection events such as matched acoustic signatures and motion/position changes. The data sets in combination with the software enable the collection, sharing, and notifying of system status alerts. Collection, sharing, and notifying of system status alerts include any electronic media form and format, to include, but not be limited to, text messages, phone messages, video messages, audio streaming, and video streaming.

The system (100) not only protects the designated land and water approach areas/aprons, as shown in FIG. 1, surrounding a home or ranch (190) when installed and operational, but further it provides protection coverage for the air space above home or ranch (190) from unmanned flying aerial drones. Any drone that approaches, circles, and/or hovers near or within the protected space (territory, perimeter) will be detected by the security system (100) and intercepted and/or incapacitated.

The means/methods of providing user and system security are accomplished by implementing and including biometric user and occupant verification and security systems, which may alternatively include, but not be limited to, any combination of user-name/password, second device verification, face recognition, voice recognition, and theft and tamper resistance. Said theft and tamper resistance may comprise, but not be limited to, physical device access control hardening with metal security impediments, delivery of electric shock or pepper spray, and locking system access. Said security features are enabled by further including, but not being limited to, notification and warnings with audio, images, and video of unidentified persons; neighborhood watch information sharing when there is a common space of coverage between two systems; and public authority notification to include, but not be limited to, unsafe indications from systems and audio, images, and video of unidentified persons. Such security features enable confidence of competent secure remote operation.

The means/methods of incapacitating the drone may alternatively include, but not be limited to, any combination of countermeasures such as jamming radio broadcast control signals, jamming audio, radio, and video signals, assuming radio control of said drone (landing it, and turning it off), turning off audio, power, radio, or video systems within said drone, powering on safety and/or default drone protection shutdown and emergency operations procedures within said drones, and or substituting security system (100) controlled signals to simulate continued operation of said drone.

These functions of detecting of an overhead drone and said means of incapacitating said drones are unique to the system of the present invention. No other home security device in existence has these capabilities.

The system of the present invention comprises multi-function networked sensors that self-organize into a meshed network. Each Sensor contains one or more of the following: An Acoustic Detector, a motion detector, an Infrared sensor array, an infrared LED, a Solar Cell, an Acoustic Generator, and an Antenna. These sensor arrays detect, quantify and forward relevant situational information to Command and Control Units and other designated recipients. Individual systems of the present invention self-organize into a secure network upon deployment. The sensor network continually provides specific data and information sets. These data sets include active alerts and detection events such as matched acoustic signatures and motion/position changes.

The system of the present invention not only protects the designated area, but also the air space above it from unmanned flying drones. Any drone that starts circling and/or hovering over the protected territory will be detected by the security system and intercepted. These functions of detecting of an overhead drone and means of incapacitating the drone are unique to the present invention and no other home security device in existence have these capabilities.

In the preferred embodiment the apparatus is configured to enable to define a user defined protection zone using an automated acoustic detection and a triangulated geospatial position for an unmanned drone within 1000 meters of said apparatus and to automatically create and activate any combination of a notice, a warning, and a countermeasure as defined by said user to prevent intrusion by and provide protection against unmanned drone entering or operating in the space surrounding said defined protection zone. In alternative embodiments the distance range is less than 1000 meters. In alternative embodiments the distance range is more than 1000 meters in increments matching the distance range of a single sensor unit because the apparatus is alternatively configured with software to extend the operational range of any one of a plurality of installations of the present invention positioned to intercommunicate.

In an embodiment, said countermeasures comprise a jamming radio broadcast, an assumption of an operation of said drone, a signal turning off audio, power, radio, or video systems within said drone, a signal powering on a safety and/or default drone protection shutdown and emergency operation procedure contained within said drones, and or substituting an alternate radio, audio, video, and signal to simulate continued operation of said drone to a remote operator receiving said alternate radio, audio, video, and signal instead of an actual operating drone's radio, audio, video, or signal.

In an embodiment, said first security dome apparatus, said first remote sensor apparatus, and said second remote sensor apparatus is further comprising a first motion sensor, a second motion sensor, and a third motion sensor, respectively, wherein said first security dome apparatus is further enabled to provide theft and tamper resistance of said apparatus within said defined protection zone by enabling said automated wireless message thereby sending a notice to the user, or a public authority of sensed motion from said first remote sensor apparatus, or said second remote sensor apparatus indicating theft of or tampering with said apparatus, and thereby enabling an increased confidence of competent remote operation or autonomous remote operation.

In an embodiment, said first security dome apparatus further comprises a computer system user biometric access means for the user.

In an embodiment, the apparatus is further comprising a contact sensor device to deliver an electric shock for unauthorized access in the presence of a sensed contact by said contact sensor device or sensed motion from said motion sensors indicating theft of or tampering with said apparatus, and thereby enabling a further increased confidence of competent remote operation or autonomous remote operation.

In an embodiment, the apparatus is further comprising messages/notices wherein said automated wireless message comprises a public authority notification having an entered report from a user, a plurality of the available audio, image, and video recorded by said DPS apparatus reporting said automated wireless message and a similar data set from other neighborhood watch information sharing connected systems.

In an embodiment, the apparatus is further comprising software configured to enable a neighborhood watch information sharing between a plurality of said apparatuses when there is a common space of coverage between a plurality of said apparatuses, and enabling said automated wireless message thereby sending a notice to the users, a group of users, or a response authority or a public authority of an unmanned drone presence within the defined protection zone of any of said DPS apparatuses enabling an automated cross apparatus communication in and amongst said plurality of said apparatuses and said response authority.

An electrical power unit is generally, but not limited to, a device wherein a capacitor, such as a battery, provides power directly to the apparatus to be powered and wherein said capacitor/battery is electrically powered by a cord or cordless connection to an electrical supply. The corded or cordless electrical power can be any available technology to supply electricity for charging the capacitor/battery, and can optionally include an uninterruptible power supply (UPS) to provide a continuous supply of electrical power.

In an embodiment, a user input device includes, but is not limited to, a numeric keypad/board, an alphanumeric keypad/board, and/or a video interface.

A computer system user biometric access means for the user is a combination of computer hardware and software needed to obtain a biometric identification measurement (data point, photo, scan, and/or sample) for a user and then compare that biometric data to known verified biometric data for validation/verification and to enable the user to access and/or use the system. This is the hardware and software needed to ensure a user is the person that they are attempting to login identified as. The biometric access means can be any situationally suitable biometric measurement to include, but not be limited to, a finger print scan, a photo of the user, a video of the user, a retinal scan of the user, a tongue print of the user, an ear print of the user, and genetic scan of the user, a medical image of the user, a dental image of the user, and it may be combined with facial recognition software to enable a live video biometric verification.

In a base embodiment, there are two units in the security system, a main unit operated with battery backup, and a sensor unit that is battery operated. In an embodiment, there are two units in the security system, a main unit that is battery operated with a battery backup, and a sensor unit that is battery operated with a battery backup.

In an embodiment, the sensor unit will talk to the main unit and main unit will communicate with the mobile application. The sensor unit is a battery-operated device and used to guard the perimeter of the property. Sensor unit will detect whether any authorized/unauthorized person has entered the property using its inbuilt camera and face recognition algorithm. The system should alert the user and start recording when any unauthorized person enters the property.

In one embodiment, the system acoustically detects the drone/UAV/UAS and should be able to trigger the optional jammer device. The system is enabled by software and hardware to detect any remote operated devices/machines and jam the communication, and optionally is able to trigger an optional jammer device.

In one embodiment, the system is weatherproof and tamper-resistant. If an unauthorized person approaches the sensor unit, the sensor unit should arm itself and when touch an electric shock should be delivered and alert is sent to the main unit.

In one embodiment, the mobile software application will allow the user to set the perimeter, select the photo of the person to mark him/her safe or unsafe, ignore, connect with someone or call the police.

In one embodiment, a protected zone is a volumetric space defined by at least a height, a length, and a width dimension. These minimum dimensions define a cubic volume to be protected by the apparatus of the present invention. A protected zone is any definable amorphous volumetric space wherein the dimensions are a closed container. This protected zone is further definable by determining a geospatial positional placement.

In one embodiment, a power source is rechargeable battery. In an embodiment a power source is wireless rechargeable battery. In an embodiment a power source is corded electrical connection.

In one embodiment, the systems of the present invention will hear the sound coming from drone's propeller (detect), interfere with drone's communication with its control (disable) and manipulate the GPS signal and disorient the drone (deter). Only one unit is needed for detection of drones. Second sensor is optional for detection with location and direction.

In one embodiment, the systems of the present invention has a user configurable drone response to include misleading the drone with different coordinate data, evoking the auto-landing in airport zone function where in the drone is tricked into operation by the system giving misleading coordinates.

In one embodiment, drone disabling is done with a jamming unit that could be in separate device, or incorporated into the sensor device.

In one embodiment, as soon as the camera starts recording, the user receives an alert and a five-second video. The user then has the option to do ad the video.

In one embodiment, detecting drones using the sound requires a sophisticated microphone setup and the good sound detection algorithm, along with an audio signature f latching technique. This is software functioning is incorporated into the software of the present invention.

In the base or minimal embodiment, there is a home security dome apparatus for detecting, deterring, and disabling a drone upon entry of said drone within a protected zone having at least three boundary dimensions comprising a control device comprising a box having a software application operating on a central processing device, a digital data store, a wireless communications device, a wired communication device, and a power source, and a first sensor device comprising a weather resistant box having an user operation interface, a software application operating on a central processing device, a digital data store, a wireless communications device, a microphone, a camera, and a power source, configured to enable an user to input said boundary dimensions and determine a spatial volume for said protection zone, to hear a sound coming from said drone (detect), to broadcast a false GPS signal to said drone and thereby disorient said drone (deter), and to broadcast a false operator control signal to said drone and thereby interfere with said drone's operation (disable).

In the preferred embodiment, there is a home security dome apparatus for detecting, deterring, and disabling a drone upon entry of said drone within a protected zone having at least three boundary dimensions comprising a control device comprising a box having a software application operating on a central processing device, a digital data store, a wireless communications device, a wired communication device, and a power source, a first sensor device comprising a weather resistant box having an user operation interface, a software application operating on a central processing device, a digital data store, a wireless communications device, a microphone, a camera, and a power source, and a second sensor device comprising a weather resistant box having an user operation interface for an user, a software application operating on a central processing device, a digital data store, a wireless communications device, a microphone, a camera, and a power source configured to enable an user to input said boundary dimensions and determine a spatial volume for said protection zone, to hear a sound coming from said drone (detect), to broadcast a false GPS signal to said drone and thereby disorient said drone (deter), and to broadcast a false operator control signal to said drone and thereby interfere with said drone's operation (disable), and to record a reporting of a position, a direction, and a speed calculation for said drone thereby enabling a drone position travel log having a series of said reports.

In an alternate embodiment, there is the base embodiment and the preferred embodiment further comprising a video camera device comprising a weather resistant box having a central processing device, a digital data store, a wireless communications device, a camera, and a power source enabled for operational control by the control device or the sensor device enabling an additional video feed for said sensor device.

In an alternate embodiment, there is the base embodiment and the preferred embodiment further comprising a 2-way speaker device comprising a weather resistant box having a central processing device, a digital data store, a wireless communications device, an audio speaker, a microphone, and a power source enabled for operational control by said sensor device enabling a two way audio communication to enable an audio security verification and an audible tone/alarm signal.

In an alternate embodiment, there is the base embodiment and the preferred embodiment further comprising a security lighting unit comprising a weather resistant box having a central processing device, a wireless communications device, a light source, and a power source enabled for operational control by said control device or said sensor device enabling a visible light projection.

In an alternate embodiment, there is the base embodiment and the preferred embodiment further comprising a drone jamming unit comprising a software application running on a central processing device, a digital data store, a wireless communications device, and a power source enabled for operational control by said control device or said sensor device enabling a wireless communications signal jamming of said drone.

In an alternate embodiment, there is the base embodiment and the preferred embodiment further comprising said sensor unit configured to forward a detected data to said central device for processing thereby enabling a power savings for said sensor unit.

The invention has been described by way of examples only. Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the claims.

Although the invention has been explained in relation to various embodiments, it is to be understood that many other possible modifications and variations can be made without departing from the spirit and scope of the invention.

The invention claimed is:

1. A home security system (HSS) comprising:
   a plurality of home security dome apparatus (SDA) configured for detecting, deterring, and disabling a drone using a sound emanated from said drone upon entry of said drone within a protected zone having boundary dimensions,
   each of said plurality of SDA comprising:
      a control device comprising a control box having a control central processing device running a non-transitory control software application,
      a digital control data store,
      a wireless control communications device,
      a wired control communications device,
      a control power source,
      a sensor device comprising a weather-resistant sensor box having a user operation interface,
      a sensor software application operating on a sensor central processing device,
      a digital sensor data store,
      a wireless sensor communications device,
      a microphone to detect said sound emanated from said drone,
      a camera to capture visual data related to drone detection,
      a sensor power source,
   configured to enable a user to input said boundary dimensions and determine a spatial volume for said protection zone, to detect said drone by hearing said sound emanated from said drone, to deter said drone by broadcasting a signal to said drone and thereby disorienting said drone, and to disable said drone by broadcasting an operator control signal to said drone and thereby interfere with an operation of said drone,
   wherein said control software application and said sensor software application are configured to determine where there is a common space within said protected zone between a plurality of said SDAs.

2. The HSS according to claim 1, wherein said control software application and said sensor software application are configured to share detection and deterrence information between multiple SDAs, thereby extending protection to neighboring homes or properties that do not have an SDA installed within their boundaries.

3. The HSS of claim 1, wherein said control software application and said sensor software application are configured to extend protection to a second property that does not have an SDA within said common space shared by multiple SDAs.

4. The HSS of claim 1, wherein said control software application and said sensor software application are configured to protect a second home without an SDA within a perimeter input with said user operation interface.

5. The HSS of claim 1 further comprising:
   a video camera device, said video camera device comprising:
      a weather-resistant camera box having a camera central processing device,
      a digital camera data store for storing video data,
      a wireless camera communications device,
      a camera power source, a video feed enabled for operational control by said control device or said sensor device, providing additional video monitoring of drone activity.

6. The HSS of claim 1 further comprising a 2-way speaker device comprising:
a weather-resistant speaker box having a speaker central processing device,
a digital speaker data store,
a wireless speaker communications device,
an audio speaker,
said microphone, and
a speaker power source,
enabled for operational control by said sensor device, enabling two-way audio communication for security verification and an audible tone/alarm signal.

7. The HSS of claim 1 further comprising a security lighting unit comprising:
a weather-resistant lighting box,
a lighting central processing device,
a wireless lighting communications device,
a light source, and
a lighting power source,
enabled for operational control by said control device or said sensor device, enabling visible light projection.

8. The HSS of claim 1 further comprising a drone jamming unit, said drone jamming unit comprising:
a drone jamming software application running on a drone jamming central processing device,
a digital drone jamming data store for storing operational data,
a wireless drone jamming communications device,
a drone jamming power source,
wherein said drone jamming unit is configured to emit jamming signals to interfere with a communication and a control system of said drone within said protection zone.

9. The HSS of claim 1, further comprising said control central processing device configured to forward detected data to said control central processing device for processing, thereby enabling power savings for said sensor central processing device and said digital sensor data store.

10. The HSS according to claim 1, wherein said microphone comprises a sound sensor to detect a sound in a range that does not encroach upon human and domesticated animal hearing ranges.

11. The HSS according to claim 1, wherein said sensor device comprises an acoustic generator.

12. A home security method (HSM) for using a home security system (HSS) as in claim 1 to detect, deter, and disable a drone, comprising:
placing each home security dome apparatus (SDA) at a respective home to be protected,
operating said control box of each SDA by running said control software application on said control central processing device in said control box,
operating said first sensor device of each SDA by running said sensor software control application on said control central processing device in said first sensor device,
inputting said boundary dimensions of said protected zone of each SDA using a user input device,
running said control software application and said sensor software application of each SDA to determine where said common space is within said protected zones of said SDAs.

13. A home security dome apparatus configured for detecting, deterring, and disabling a drone using a sound emanated from said drone upon entry of said drone within a protected zone having at least three boundary dimensions comprising:
a control device comprising:
a control box having a control central processing device running a control software application,
a digital control data store,
a wireless control communications device,
a wired control communication device,
a control power source,
a first sensor device comprising:
a first weather-resistant sensor box having a user operation interface,
a first sensor software application operating on a first sensor central processing device,
a first digital sensor data store,
a first wireless sensor communications device,
a first microphone,
a first camera,
a first sensor power source,
a second sensor device comprising:
a second weather-resistant sensor box having said user operation interface,
a second software application operating on a second sensor central processing a second digital sensor data store,
a second wireless sensor communications device,
a second microphone,
a second camera, and
a second sensor power source,
configured to enable a user to input said boundary dimensions and determine a spatial volume for said protection zone, to detect said drone by hearing said sound emanated from said drone, to deter said drone by broadcasting a signal to said drone and thereby disorienting said drone, to disable said drone by broadcasting an operator control signal to said drone and thereby interfere with said an operation of said drone, and to record a reporting of a position, a direction, and a speed calculation for said drone, thereby enabling a drone position travel log having a series of reports.

* * * * *